US012709347B2

(12) United States Patent
Menjo et al.

(10) Patent No.: US 12,709,347 B2
(45) Date of Patent: Aug. 18, 2026

(54) ROAD SURFACE RENDERING DEVICE

(71) Applicant: KOITO MANUFACTURING CO., LTD., Tokyo (JP)

(72) Inventors: Yosuke Menjo, Shizuoka (JP); Koichi Tanabe, Shizuoka (JP); Shingo Kato, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 82 days.

(21) Appl. No.: 18/844,867

(22) PCT Filed: Mar. 8, 2023

(86) PCT No.: PCT/JP2023/008763
§ 371 (c)(1),
(2) Date: Sep. 6, 2024

(87) PCT Pub. No.: WO2023/171700
PCT Pub. Date: Sep. 14, 2023

(65) Prior Publication Data

US 2025/0187690 A1 Jun. 12, 2025

(30) Foreign Application Priority Data

Mar. 9, 2022 (JP) ................................ 2022-036214

(51) Int. Cl.
*B62J 6/26* (2020.01)
*B62J 6/057* (2020.01)

(52) U.S. Cl.
CPC *B62J 6/26* (2020.02); *B62J 6/057* (2020.02)

(58) Field of Classification Search
CPC ................................... B62J 6/26; B62J 6/057
USPC .......................................................... 340/465
See application file for complete search history.

(56) References Cited

U.S. PATENT DOCUMENTS

2017/0101147 A1 4/2017 Hasegawa
2020/0207258 A1* 7/2020 Tezuka ................. F21S 41/143
2021/0162927 A1 6/2021 Takii et al.
2022/0178509 A1 6/2022 Okubo et al.
2024/0052985 A1 2/2024 Okubo et al.
(Continued)

FOREIGN PATENT DOCUMENTS

CN 212556023 U 2/2021
JP 2017-074820 A 4/2017
(Continued)

OTHER PUBLICATIONS

International Search Report issued in corresponding International Patent Application No. PCT/JP2023/008763, mailed on Apr. 18, 2023 (6 pages).

(Continued)

*Primary Examiner* — Kam Wan Ma
(74) *Attorney, Agent, or Firm* — Osha Bergman Watanabe & Burton LLP

(57) ABSTRACT

A road surface rendering device for projecting an area marker on a road surface around the vehicle. The road surface rendering device is to be mounted on a vehicle. The area marker is configured to be constantly projected at least during nighttime traveling of the vehicle. In a case where a traveling state of the vehicle changes, a projection region of the area marker transitions from a first region to a second region different from the first region.

15 Claims, 9 Drawing Sheets

(56) References Cited

U.S. PATENT DOCUMENTS

| | | | | |
|---|---|---|---|---|
| 2024/0052986 | A1 | 2/2024 | Okubo et al. | |
| 2024/0210003 | A1 | 6/2024 | Okubo et al. | |
| 2025/0187690 | A1 * | 6/2025 | Menjo | B62J 6/26 |

FOREIGN PATENT DOCUMENTS

| | | | | |
|---|---|---|---|---|
| JP | 2020-163910 | A | 10/2020 | |
| JP | 2020-202087 | A | 12/2020 | |
| WO | WO-2020036108 | A1 * | 2/2020 | B60Q 1/503 |
| WO | WO-2021039612 | A1 * | 3/2021 | B62J 6/22 |

OTHER PUBLICATIONS

Written Opinion issued in corresponding International Patent Application No. PCT/JP2023/008763, mailed on Apr. 18, 2023 (4 pages).

* cited by examiner

ROAD SURFACE RENDERING DEVICE

TECHNICAL FIELD

The present disclosure relates to a road surface rendering device.

BACKGROUND ART

An area marker lamp as disclosed in Patent Literature 1 is known. The area marker lamp has a notification function of notifying surroundings of presence of a vehicle by projecting a marker onto a road surface around the vehicle on which the lamp is mounted.

Patent Literature 1 discloses a lamp that is provided in a vehicle capable of turning by inclining a vehicle body and projects a marker onto a road surface around the vehicle. The marker includes a right marker positioned on a right side of the vehicle and having a predetermined color, and a left marker positioned on a left side of the vehicle and having a predetermined color.

CITATION LIST

Patent Literature

Patent Literature 1: WO2021/039612A1

SUMMARY OF INVENTION

Technical Problem

In recent years, electric vehicles have been actively developed. Since the electric vehicle is driven by using an electric motor, the electric vehicle has high quietness and less vibration as compared with a gasoline vehicle in which gasoline is combusted. Therefore, the vehicle of the electric vehicle is less likely to be visually recognized by the surroundings as compared with the gasoline vehicle, and a further improvement in a notification function is desired.

An object of the present disclosure is to provide a road surface rendering device in which a notification function to the surroundings is improved.

Solution to Problem

A road surface rendering device according to the present disclosure for projecting an area marker on a road surface around a vehicle, the road surface rendering device to be mounted on the vehicle, in which the area marker is configured to be constantly projected at least during nighttime traveling of the vehicle, and in a case where a traveling state of the vehicle changes, a projection region of the area marker transitions from a first region to a second region different from the first region.

A road surface rendering device according to the present disclosure for projecting an area marker on a road surface around a vehicle, the road surface rendering device to be mounted on the vehicle, in which the area marker is configured to be constantly projected at least during nighttime traveling of the vehicle, and in response to a determination that calling attention of traffic participant is required, a projection region of the area marker transitions from a first region to a second region different from the first region.

Advantageous Effects of Invention

According to the road surface rendering device of the present disclosure, since the area marker is constantly projected at least during nighttime traveling of the vehicle, the surroundings can be notified of presence of the vehicle. Further, in the road surface rendering device according to the present disclosure, the projection region of the area marker transitions from the first region to the second region according to the traveling state of the vehicle or the calling of the attention of the another traffic participant. In a case in which the area marker is projected only onto one region, the presence of the vehicle can be recognized only by the surrounding vehicles or persons who can visually recognize the one region, but according to the road surface rendering device of the present disclosure, the area marker is projected onto a plurality of regions, thereby making it possible to notify the surroundings in a wider range. In addition, since the projection region of the area marker transitions from the first region to the second region, attention can be easily attracted as compared with an area marker of which a projection region does not transition, and the surroundings can be effectively notified of the presence of the vehicle.

DESCRIPTION OF EMBODIMENTS

Figure 1:
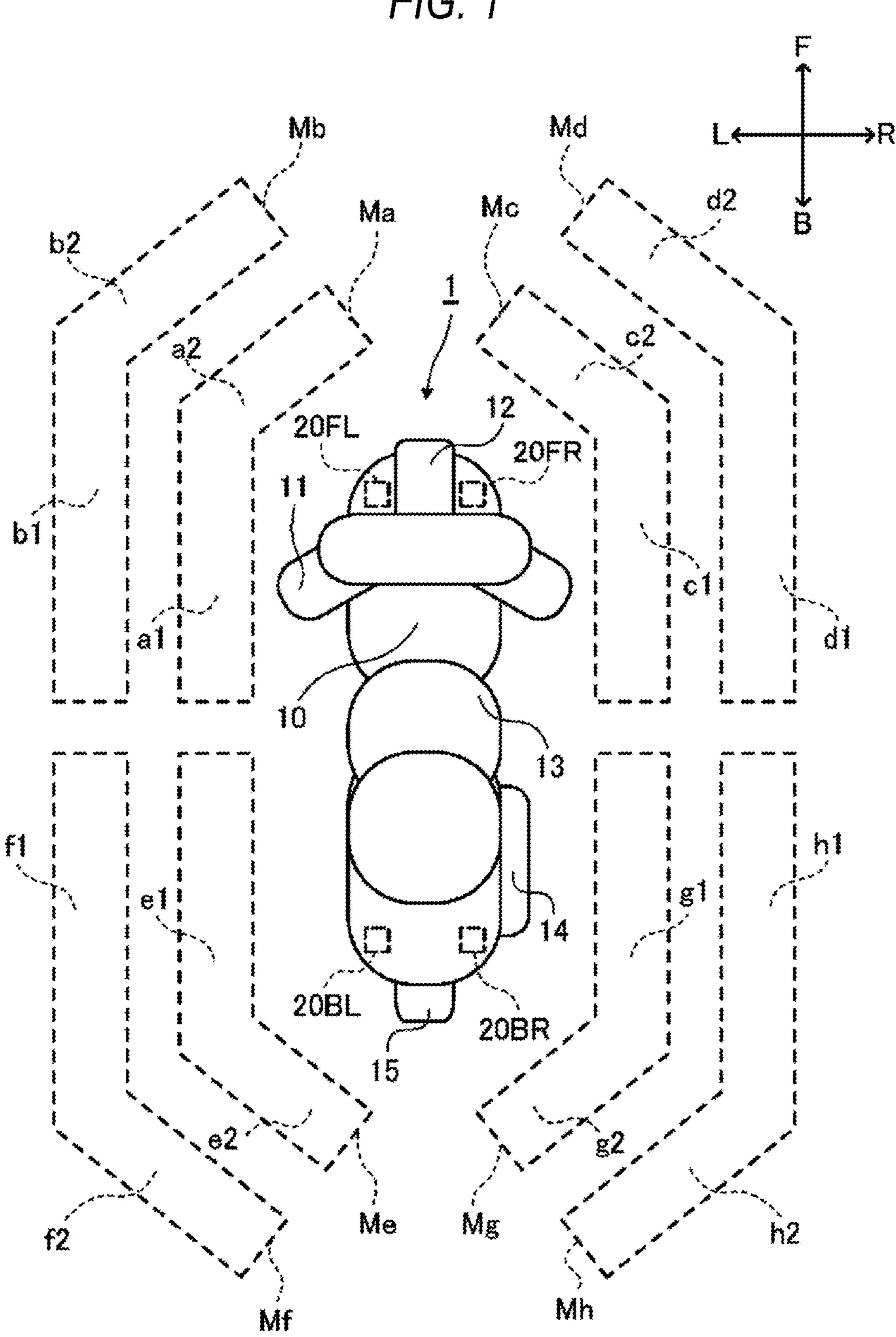
FIG. 1 is a plan view of a vehicle on which a road surface rendering device according to the present embodiment can be mounted and an area marker projected from the vehicle.

Hereinafter, an embodiment of the present disclosure (hereinafter, referred to as the present embodiment) will be described with reference to the drawings. Dimensions of members illustrated in the drawings may be different from actual dimensions of the members for convenience of description.

In the description of the present embodiment, for convenience of description, a "left and right direction", an "up and down direction", and a "front and rear direction" may be appropriately referred to. The directions are relative directions set for a vehicle illustrated in FIG. 1. Here, the "left and right direction" is a direction that includes a "left direction" and a "right direction". The "up and down direction" is a direction that includes an "up direction" and a "down direction". The "front and rear direction" is a direction that includes a "front direction" and a "rear direction". Although not illustrated in FIG. 1, the front and rear direction is a direction orthogonal to the left and right direction and the up and down direction.

FIG. 1 is a plan view illustrating a motorcycle 1 as an example of the vehicle and an area marker M projected from the motorcycle 1. The motorcycle 1 is a vehicle configured to turn by inclining a vehicle body 10 in a bending direction. The vehicle according to the present example only needs to be a vehicle capable of turning by inclining the vehicle body in the bending direction as in the motorcycle 1, and the number of wheels is not limited. Accordingly, for example, a three-wheeled motor vehicle or a four-wheeled motor vehicle is also included in the vehicle according to the present example as long as the vehicle can travel in the same manner as the motorcycle 1.

As illustrated in FIG. 1, the motorcycle 1 includes the vehicle body 10, a handlebar 11, a front wheel 12, a seat 13, a muffler 14, a rear wheel 15, and a marker lamp 20. In the present example, a traveling direction of the motorcycle 1 (in FIG. 1, a direction from the seat 13 or the rear wheel 15 toward the handlebar 11 or the front wheel 12) is defined as the front direction. The marker lamp 20 is an example of a road surface rendering device.

The marker lamp 20 is a lighting tool to be mounted on the motorcycle 1 and configured to project the area marker M onto a road surface around the motorcycle 1. The area marker M is a light irradiation region that is visually recognized by surrounding traffic participants in which the road surface around the motorcycle 1 is irradiated with light emitted from the marker lamp 20. The area marker M may be set to have a shape surrounding the periphery of the motorcycle 1 by 360 degrees, or may have a shape in which a part thereof is interrupted as illustrated in FIG. 1. The area marker M is basically irradiated with light having a common color and brightness so as to give the traffic participant an impression that the area marker M is formed in a manner of surrounding the periphery of the motorcycle 1.

The marker lamp 20 according to the present example constantly project the area marker M at least during night-time traveling of the motorcycle 1. The marker lamp 20 according to the present example includes a left front lamp 20FL, a right front lamp 20FR, a left rear lamp 20BL, and a right rear lamp 20BR. The illustrated area marker M is projected by the lamps 20FL, 20FR, 20BL, and 20BR onto a diagonally forward left region, a diagonally forward right region, a diagonally rearward left region, and a diagonally rearward right region of the motorcycle 1.

The left front lamp 20FL is disposed on a left front side of the vehicle body 10, and is configured to project the area marker M onto a region Ma and a region Mb of the road surface on the left front side of the motorcycle 1. The left front lamp 20FL is configured to alternately project the area marker M onto the region Ma and the region Mb.

The region Ma includes, on the left side of the vehicle body 10, a main portion a1 extending forward from a position corresponding to a center of the vehicle body 10 in the front and rear direction, and a sub portion a2 extending rightward and forward from a front end of the main portion a1.

The region Mb includes, on the left side of the vehicle body 10, a main portion b1 extending forward from a position corresponding to the center of the vehicle body 10 in the front and rear direction, and a sub portion b2 extending rightward and forward from a front end of the main portion b1.

The region Mb is positioned farther from the motorcycle 1 in a diagonally forward left direction as compared with the region Ma. The region Ma and region Mb are separated from each other at positions that do not overlap each other.

In the present example, a color of the area marker M projected onto the region Ma and a color of the area marker M projected onto the region Mb are the same color, for example, blue. The region Ma is an example of a first region. The region Mb is an example of a second region.

The right front lamp 20FR is disposed on a right front side of the vehicle body 10, and is configured to project the area marker M onto a region Mc and a region Md of the road surface on the right front side of the motorcycle 1. The right front lamp 20FR is configured to alternately project the area marker M onto the region Mc and the region Md.

The region Mc includes, on a right side of the vehicle body 10, a main portion c1 extending forward from a position corresponding to the center of the vehicle body 10 in the front and rear direction, and a sub portion c2 extending leftward and forward from a front end of the main portion c1.

The region Md includes, on the right side of the vehicle body 10, a main portion d1 extending forward from a position corresponding to the center of the vehicle body 10 in the front and rear direction, and a sub portion d2 extending leftward and forward from a front end of the main portion d1.

The region Md is positioned farther from the motorcycle 1 in a diagonally forward right direction as compared with the region Mc. The region Mc and region Md are separated from each other at positions that do not overlap each other.

In the present example, a color of the area marker M projected onto the region Mc and a color of the area marker M projected onto the region Md are the same color, for example, blue. The region Mc is an example of the first region. The region Md is an example of the second region.

The left rear lamp 20BL is disposed on a left rear side of the vehicle body 10, and is configured to project the area marker M onto a region Me and a region Mf of the road surface on the left rear side of the motorcycle 1. The left rear lamp 20BL is configured to alternately project the area marker M onto the region Me and the region Mf.

The region Me includes, on the left side of the vehicle body 10, a main portion e1 extending rearward from a position corresponding to the center of the vehicle body 10 in the front and rear direction, and a sub portion e2 extending rightward and rearward from a rear end of the main portion e1.

The region Mf includes, on the left side of the vehicle body 10, a main portion f1 extending rearward from a position corresponding to the center of the vehicle body 10 in the front and rear direction, and a sub portion f2 extending rightward and rearward from a rear end of the main portion f1.

The region Mf is positioned farther from the motorcycle 1 in a diagonally rearward left direction as compared with the region Me. The region Me and region Mf are separated from each other at positions that do not overlap each other.

In the present example, a color of the area marker M projected onto the region Me and a color of the area marker M projected onto the region Mf are the same color, for example, blue. The region Me is an example of the first region. The region Mf is an example of the second region.

The right rear lamp 20BR is disposed on a right rear side of the vehicle body 10, and is configured to project the area marker M onto a region Mg and a region Mh of the road surface on the right rear side of the motorcycle 1. The right rear lamp 20BR is configured to alternately project the area marker M onto the region Mg and the region Mh.

The region Mg includes, on the right side of the vehicle body 10, a main portion g1 extending rearward from a position corresponding to the center of the vehicle body 10 in the front and rear direction, and a sub portion g2 extending leftward and rearward from a rear end of the main portion g1.

The region Mh includes, on the right side of the vehicle body 10, a main portion h1 extending rearward from a position corresponding to the center of the vehicle body 10 in the front and rear direction, and a sub portion h2 extending leftward and rearward from a rear end of the main portion h1.

The region Mh is positioned farther from the motorcycle 1 in a diagonally rearward right direction as compared with the region Mg. The region Mg and region Mh are separated from each other at positions that do not overlap each other.

In the present example, a color of the area marker M projected onto the region Mg and a color of the area marker M projected onto the region Mh are the same color, for example, blue. The region Mg is an example of the first region. The region Mh is an example of the second region.

The region Ma and region Mc are formed at symmetrical positions with respect to the vehicle body 10 in the left and right direction. The region Mb and region Md are formed at symmetrical positions with respect to the vehicle body 10 in the left and right direction. The region Me and the region Mg are formed at symmetrical positions with respect to the vehicle body 10 in the left and right direction. The region Mf and region Mh are formed at symmetrical positions with respect to the vehicle body 10 in the left and right direction. The region Ma and region Me are formed at symmetrical positions with respect to the center of the vehicle body 10 in the front and rear direction. The region Mc and the region Mg are formed at symmetrical positions with respect to the center of the vehicle body 10 in the front and rear direction. The region Mb and region Mf are formed at symmetrical positions with respect to the center of the vehicle body 10 in the front and rear direction. The region Md and region Mh are formed at symmetrical positions with respect to the center of the vehicle body 10 in the front and rear direction. The shape and position of each area marker illustrated in FIG. 1 are merely examples, and the shape and position are not particularly limited as long as the area markers are formed in a manner of surrounding the motorcycle 1.

Figure 2:
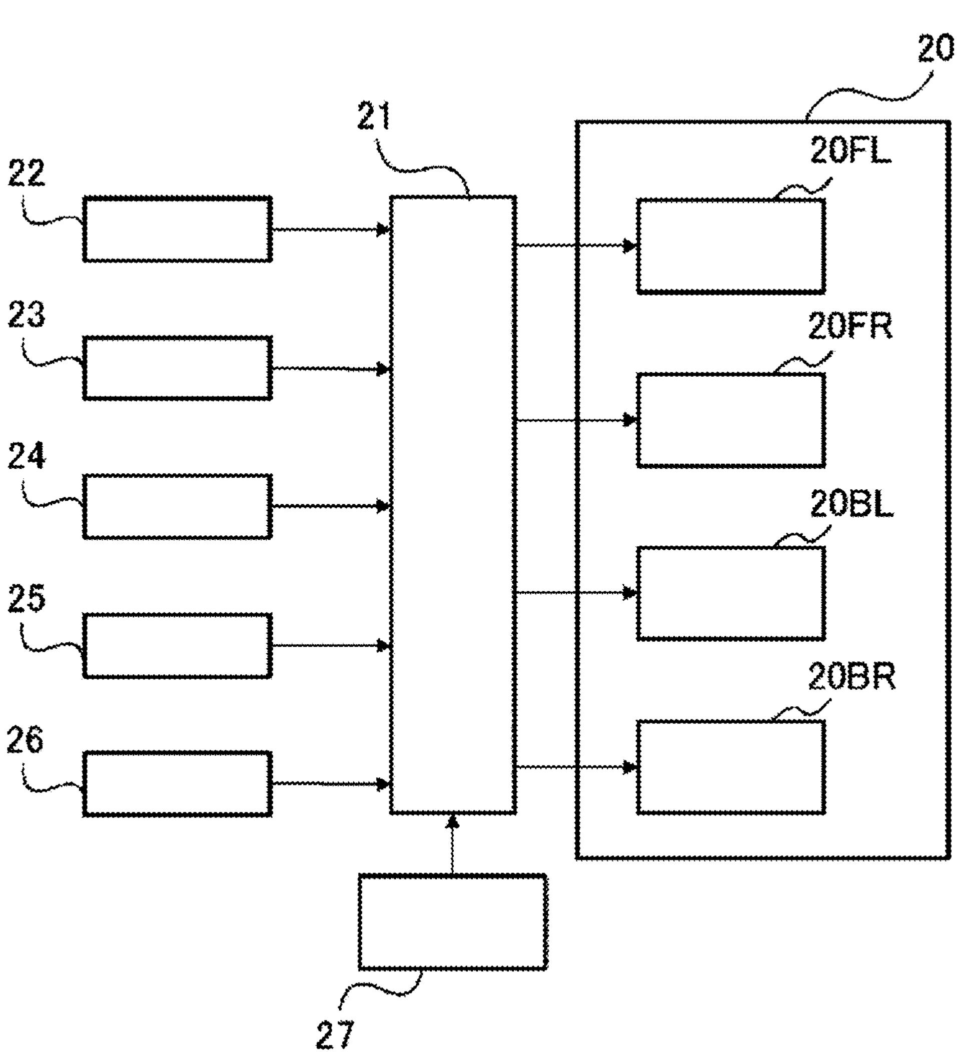
FIG. 2 is a block diagram illustrating a configuration of the vehicle illustrated in FIG. 1.

FIG. 2 is a block diagram illustrating a configuration of the motorcycle 1. As illustrated in FIG. 2, the motorcycle 1 includes a lamp controller 21 configured to control the marker lamp 20 including the left front lamp 20FL, the right front lamp 20FR, the left rear lamp 20BL, and the right rear lamp 20BR. The left front lamp 20FL, the right front lamp 20FR, the left rear lamp 20BL, and the right rear lamp 20BR are electrically connected to the lamp controller 21. Further, an acceleration sensor 22, a brake sensor 23, a turn switch 24, a bank angle sensor 25, an external sensor 26, and a storage 27 are electrically connected to the lamp controller 21.

The lamp controller 21 is, for example, an integrated circuit such as a microcontroller, an integrated circuit (IC), a large-scale integrated circuit (LSI), or an application specific integrated circuit (ASIC), or a numerical control (NC) device. When the lamp controller 21 is an NC device, machine learning may be used or may not be used. The lamp controller 21 may be provided in the marker lamp 20 or may be provided in the vehicle body 10 as a part of a controller of the motorcycle 1. The acceleration sensor 22, the brake sensor 23, the turn switch 24, the bank angle sensor 25, the external sensor 26, and the storage 27 may be electrically connected to the lamp controller 21 via the controller of the motorcycle 1. The lamp controller 21 is an example of a determination unit and the controller.

The acceleration sensor 22 is configured to detect acceleration of the motorcycle 1. The acceleration sensor 22 is configured to detect the acceleration as a positive value in a case where the motorcycle 1 is accelerated, and is configured to detect the acceleration as a negative value in a case where the motorcycle 1 is decelerated. The acceleration sensor 22 may be, for example, an optical sensor or a semiconductor sensor. The acceleration sensor 22 is an example of a vehicle state acquiring unit.

The brake sensor 23 is configured to detect at least one of a front wheel brake operation or a rear wheel brake operation of the motorcycle 1. The brake sensor 23 may include a switch configured to be switched between on and off according to the front wheel brake operation, and a switch configured to be switched between on and off according to the rear wheel brake operation. The brake sensor 23 may be configured to detect deceleration of the motorcycle 1 based on a change in a rotation frequency (a rotation speed) of the rear wheel 15 or the front wheel 12. The brake sensor 23 is an example of the vehicle state acquiring unit.

The turn switch 24 is a switch for a driver to switch between on and off of turn signal lamps of the motorcycle 1. For example, in a case where the left turn signal lamp is turned on (a state in which the left turn signal lamp blinks), the turn switch 24 outputs a signal indicating this state to the lamp controller 21. For example, in a case where the right turn signal lamp is turned on (a state in which the right turn signal lamp blinks), the turn switch 24 outputs a signal indicating this state to the lamp controller 21. In a case where the driver operates a hazard lamp switch, the turn switch 24 may be configured to output, to the lamp controller 21, a signal indicating a state where both the left turn signal lamp and the right turn signal lamp are turned on. The turn switch 24 is an example of the vehicle state acquiring unit.

The bank angle sensor 25 is configured to detect an inclined angle between the vehicle body 10 and a vertical line in a case where the vehicle body 10 of the motorcycle 1 is inclined to the left and right with respect to the vertical line. The bank angle sensor 25 is, for example, a gyro sensor. The inclined angle of the vehicle body 10 may be configured to be calculated based on, for example, an image captured by a camera mounted on the vehicle body. The bank angle sensor 25 is an example of the vehicle state acquiring unit.

The external sensor 26 is configured to acquire information on the outside of the vehicle body 10 including a surrounding environment of the motorcycle 1 (for example, obstacles, other vehicles (preceding vehicles, oncoming vehicles), pedestrians, road shapes, traffic signs, and the like). The external sensor 26 is implemented by at least one of, for example, a light detection and ranging or laser imaging detection and ranging (LiDAR), a camera, and a radar. The external sensor 26 is an example of a traffic participant acquiring unit.

Each piece of information detected by the acceleration sensor 22, the brake sensor 23, the turn switch 24, the bank angle sensor 25, and the external sensor 26 is transmitted to the lamp controller 21. The lamp controller 21 is configured to control the marker lamp 20 based on the transmitted information. For example, the lamp controller 21 may be configured to control the left front lamp 20FL and the right front lamp 20FR, based on a detection result of the acceleration sensor 22, to project the area marker M onto the regions Ma, Mb, Mc, Md. The storage 27 is configured to store the information transmitted to the lamp controller 21 and the operation of the marker lamp 20 in association with each other. The storage 27 is, for example, a read only memory (ROM) storing various types of lamp control programs or a random access memory (RAM) temporarily storing various types of lamp control data.

Figure 3:
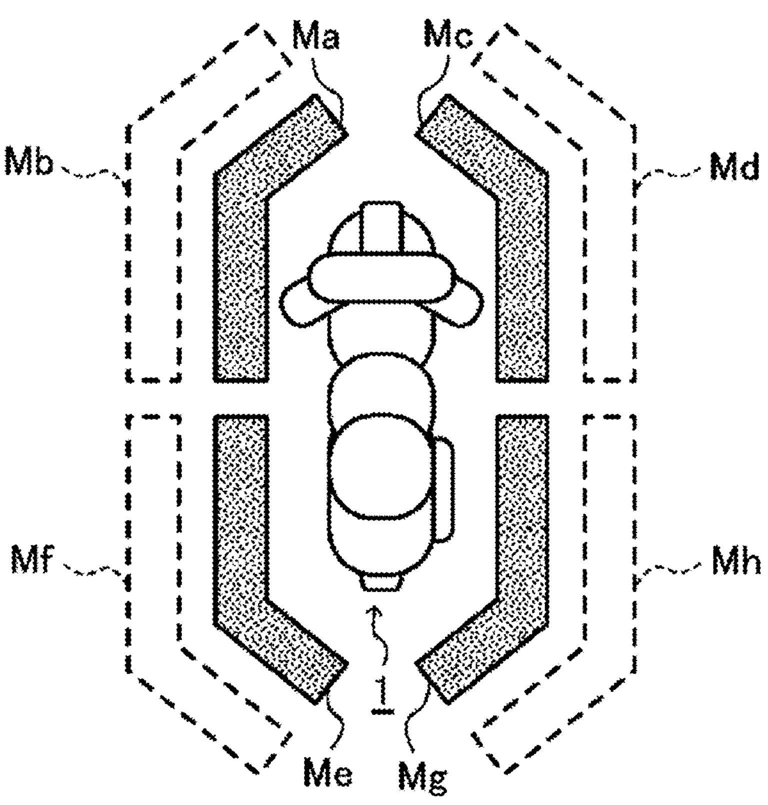
FIG. 3 is a plan view illustrating projection regions of the area marker in a case in which the vehicle is traveling without large acceleration or deceleration or right or left turn.
Figure 4:
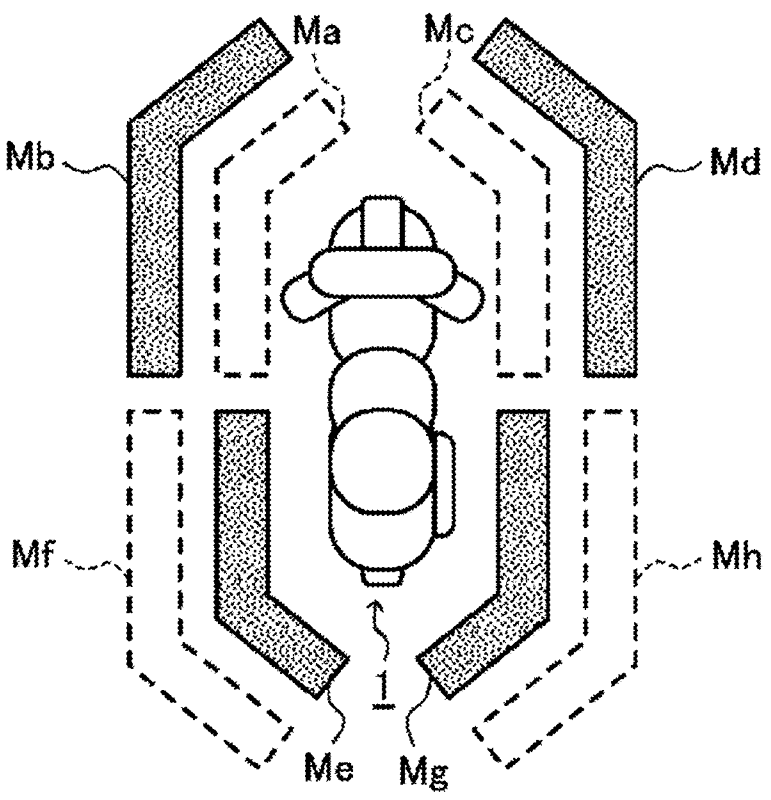
FIG. 4 is a plan view illustrating the projection regions of the area marker when the vehicle is accelerated.

Next, an operation of the marker lamp 20 in a case where the motorcycle 1 is accelerated will be described as an example of the operation of the marker lamp 20. FIG. 3 is a plan view illustrating projection regions of the area marker in a case where the motorcycle 1 is traveling without large acceleration or deceleration or right or left turn. FIG. 4 is a plan view illustrating the projection regions of the area marker M in a case where the motorcycle 1 is accelerated. Hereinafter, an operation of the marker lamp 20 in a case where the motorcycle 1 changes from a state of traveling at a predetermined speed to a state of traveling at a speed higher than the predetermined speed will be described. In the present example, a state where the motorcycle 1 is traveling at the predetermined speed, that is, a state where the acceleration of the motorcycle 1 is less than a predetermined value is referred to as a pre-acceleration state, which is an example of a first traveling state. A state where the acceleration of the motorcycle 1 is equal to or higher than the predetermined value is referred to as an accelerating state, which is an example of a second traveling state. The acceleration of the motorcycle 1 is an example when the traveling state changes such that a movement of the motorcycle 1 in the front and rear direction changes. The region Ma and the region Mc are examples of a first front region. The region Mb is an example of a second front region positioned farther forward from the motorcycle 1 as compared with the region Ma. The region Md is an example of the second front region positioned farther forward from the motorcycle 1 as compared with the region Mc.

First, in a case where the motorcycle 1 is in the pre-acceleration state, the lamp controller 21 controls the left front lamp 20FL in a manner of projecting the area marker M onto the region Ma, and controls the right front lamp 20FR in a manner of projecting the area marker M onto the region Mc (FIG. 3). The lamp controller 21 is further configured to control the left rear lamp 20BL in a manner of projecting the area marker M onto the region Me, and controls the right rear lamp 20BR in a manner of projecting the area marker M onto the region Mg (FIG. 3). For example, in a case where output of the acceleration sensor 22 indicates that the acceleration of the motorcycle 1 is equal to or less than the predetermined value, the lamp controller 21 may determine that the motorcycle 1 is in the pre-acceleration state.

Next, it is assumed that the motorcycle 1 changes from the pre-acceleration state to the accelerating state. In a case where the acceleration sensor 22 indicates that the acceleration of the motorcycle 1 is equal to or higher than the predetermined value, the lamp controller 21 may determine that the motorcycle 1 is in the accelerating state.

In a case where a change from the pre-acceleration state to the accelerating state occurs, the lamp controller 21 controls the left front lamp 20FL such that the projection region of the area marker M transitions from the region Ma to the region Mb, and controls the right front lamp 20FR such that the projection region of the area marker M transitions from the region Mc to the region Md (FIG. 4). More specifically, in a case where the traveling state changes from the pre-acceleration state to the accelerating state such that the movement of the motorcycle 1 in the front and rear direction changes, the lamp controller 21 controls the left front lamp 20FL such that the projection region of the area marker M transitions from the region Ma to the region Mb that is different from the region Ma in the front and rear direction. Similarly, the lamp controller 21 is configured to control the right front lamp 20FR such that the projection region of the area marker M transitions from the region Mc to the region Md that is different from the region Mc in the front and rear direction.

Further, while the accelerating state continues, the lamp controller 21 controls the left front lamp 20FL such that the area marker M is alternately projected onto the region Ma and the region Mb, and controls the right front lamp 20FR such that the area marker M is alternately projected onto the region Mc and the region Md (FIG. 3 and FIG. 4 are alternately repeated).

In the above embodiment, an example has been described in which the lamp controller 21 determines the pre-acceleration state and the accelerating state according to the output of the acceleration sensor 22, but the present disclosure is not limited thereto. For example, the lamp controller 21 may estimate the acceleration based on an image or a video acquired by the external sensor 26 such as a camera, and determine the pre-acceleration state and the accelerating state. Alternatively, the lamp controller 21 may determine the pre-acceleration state and the accelerating state according to output of a throttle sensor that detects an opening degree of an accelerator throttle of the motorcycle 1.

As described above, according to the marker lamp 20 of the present example, since the area marker M is projected constantly at least during nighttime traveling of the motorcycle 1, the surroundings can be notified of the presence of the motorcycle 1.

In particular, in the motorcycle 1 or a small-sized four-wheeled motor vehicle (mobility), the vehicle body 10 has a narrow vehicle width. Therefore, if another vehicle is positioned between the motorcycle 1 and the traffic participant, the motorcycle 1 may be blocked by the another vehicle and the traffic participant may not recognize the motorcycle 1. When the another vehicle is a large-sized vehicle such as a truck, the motorcycle 1 is less likely to be recognized by the traffic participant. Accordingly, it is more preferable for a small-sized vehicle such as the motorcycle 1 to have the surrounding traffic participant recognize the presence of the host vehicle and direct attention to the host vehicle. According to the marker lamp 20 of the present example, since the area marker M is constantly projected during nighttime traveling, the surroundings can be effectively notified of the presence of such a small-sized vehicle.

In particular, in a case in which the traveling state of the motorcycle 1 changes, such as performing acceleration or deceleration or right or left turning, it is preferable to have the traffic participant recognize the change in the traveling state. According to the marker lamp 20 of the present example, the projection region of the area marker M transitions from the region Ma to the region Mb, and thus it is easy to attract attention and to have the traffic participant notice the change in the traveling state of the host vehicle.

According to the traveling state of the motorcycle 1, the projection region of the area marker M transitions from the region Ma to the region Mb and transitions from the region Mc to the region Md. In a case in which the area marker M is projected only onto one region of the region Ma or the region Mc, the presence of the motorcycle 1 can be recognized only by the surrounding vehicles or persons who can visually recognize the one region, whereas according to the marker lamp 20 of the present example, the area marker M is projected onto a plurality of regions. Therefore, the surroundings in a wider range can be notified of the presence of the motorcycle 1. In addition, since the projection region of the area marker transitions from the region Ma to the region Mb and from the region Mc to the region Md, attention can be easily attracted as compared with an area marker of which a projection region does not transition, and the surroundings can be effectively notified of the presence of the motorcycle 1.

In the present example, since the region Mb is positioned farther from the motorcycle 1 as compared with the region Ma, the surroundings in a wider range can be notified of the presence of the motorcycle 1.

In the present example, the region Ma and region Mb do not overlap each other. Therefore, the area marker M can be projected onto a wider range as compared with a case in which the region Ma and the region Mb at least partially overlap each other. Accordingly, the surroundings in a wider range can be notified of the presence of the motorcycle 1.

In the present example, the change in the traveling state is a change from the pre-acceleration state (the first traveling state) to the accelerating state (the second traveling state), and the area marker M is projected alternately onto the region Ma and region Mb while the accelerating state continues. Therefore, as compared with a case in which the area marker M is projected only onto one region, the change in the traveling state can be notified in a more emphasized manner.

When the traveling state changes in a manner that the movement of the motorcycle 1 in the front and rear direction changes, it is preferable to have another vehicle or person positioned particularly in the front and rear direction of the motorcycle 1 recognize the presence of the vehicle and direct attention to the vehicle. According to the marker lamp 20 of the present example, in such a case, the projection region of the area marker M transitions from the region Ma to the region Mb that is different from the region Ma in the front and rear direction. Similarly, the projection region of the area marker M transitions from the region Mc to the region Md that is different from the region Mc in the front and rear direction. Accordingly, the another vehicle or person positioned in the front and rear direction of the motorcycle 1 can be more effectively notified of the presence of the motorcycle 1.

In general, an electric vehicle has a high acceleration performance because a time required for driving each device is short as compared with a gasoline vehicle. Therefore, it is preferable for the electric vehicle to have particularly the surroundings in front of the vehicle direct attention to the vehicle. According to the marker lamp 20 of the present example, when the motorcycle 1 is accelerated, the projection region of the area marker M transitions from the region Ma to the region Mb and transitions from the region Mc to the region Md. Accordingly, the surroundings in front of the motorcycle 1 can be notified of the presence of the motorcycle 1, and attention can be directed.

The motorcycle 1 according to the present example is a vehicle that turns by inclining the vehicle body 10 in a bending direction. A vehicle such as the motorcycle 1 or a small-sized four-wheeled motor vehicle (mobility) tends to have a narrow vehicle width in order to make the vehicle body easy to incline. Since such a vehicle with a narrow vehicle width is blocked by a large-sized vehicle such as a truck, it is preferable to have the surroundings recognize the presence of the vehicle and direct attention to the vehicle. According to the marker lamp 20 of the present example, since the area marker M is constantly projected during nighttime traveling, the surroundings can be effectively notified of the presence of such a small-sized vehicle.

However, although the case in which the motorcycle 1 is accelerated was described as the change in the traveling state, the change in the traveling state is not limited to acceleration. The change in the traveling state is at least one of (starting, stopping) and (straight traveling, left and right turn) and (acceleration and deceleration). During starting, a state in which the motorcycle 1 is stopped may be referred to as the first traveling state, a state in which the motorcycle 1 in the stopped state increases the speed (the accelerating state) may be referred to as the second traveling state, and the same operation as in FIGS. 3 and 4 may be performed on the marker lamp 20.

For example, when the motorcycle 1 is decelerated from a normal state, first, in a pre-deceleration state (an example of the first traveling state), the lamp controller 21 controls the marker lamp 20 in a manner of projecting the area marker M onto the regions Ma, Mc, Me, and Mg. Next, when it is determined from the output of the acceleration sensor 22 or the like that the lamp controller 21 is in a decelerating state (an example of the second traveling state), the lamp controller 21 controls the marker lamp 20 in a manner of projecting the area marker M onto the regions Mf and Mh. The region Me and the region Mg are examples of a first rear region. The region Mf is an example of a second rear region positioned farther rearward from the motorcycle 1 as compared with the region Me. The region Mh is an example of the second rear region positioned farther rearward from the motorcycle 1 as compared with the region Mg.

Further, while the decelerating state continues, the lamp controller 21 may control the left rear lamp 20BL in a manner that the area marker M is alternately projected onto the region Me and the region Mf, and may control the right rear lamp 20BR in a manner that the area marker M is alternately projected onto the region Mg and the region Mh.

In general, as compared with a gasoline vehicle, an electric vehicle is often equipped with a regenerative brake that applies a braking force to a wheel by transmitting rotation of the wheel to a flywheel, in addition to a mechanism such as a disc brake that mechanically applies a braking force to the wheel. Therefore, the electric vehicle is generally higher in deceleration performance as compared with a gasoline vehicle. Therefore, it is preferable for the electric vehicle to have the surroundings in rear of the vehicle including the following vehicle direct attention to the vehicle. According to the marker lamp 20 of the present example, when the motorcycle 1 is decelerated, the projection region of the area marker M transitions from the region Me to the region Mf and transitions from the region Mg to the region Mh. Accordingly, the surroundings in rear of the motorcycle 1 can be notified of the presence of the motorcycle 1, and attention can be directed.

In the above description, the case in which the motorcycle 1 is decelerated was described as the change in the traveling state, whereas as the change in the traveling state, when the motorcycle 1 is stopped, the marker lamp 20 may also perform the operation during deceleration. In this case, a state during deceleration of the motorcycle 1 is referred to as the first traveling state, and a state in which the motorcycle 1 during deceleration is stopped is referred to as the second traveling state.

Next, an operation of the marker lamp 20 in a case where the motorcycle 1 turns left will be described.

Figure 5:
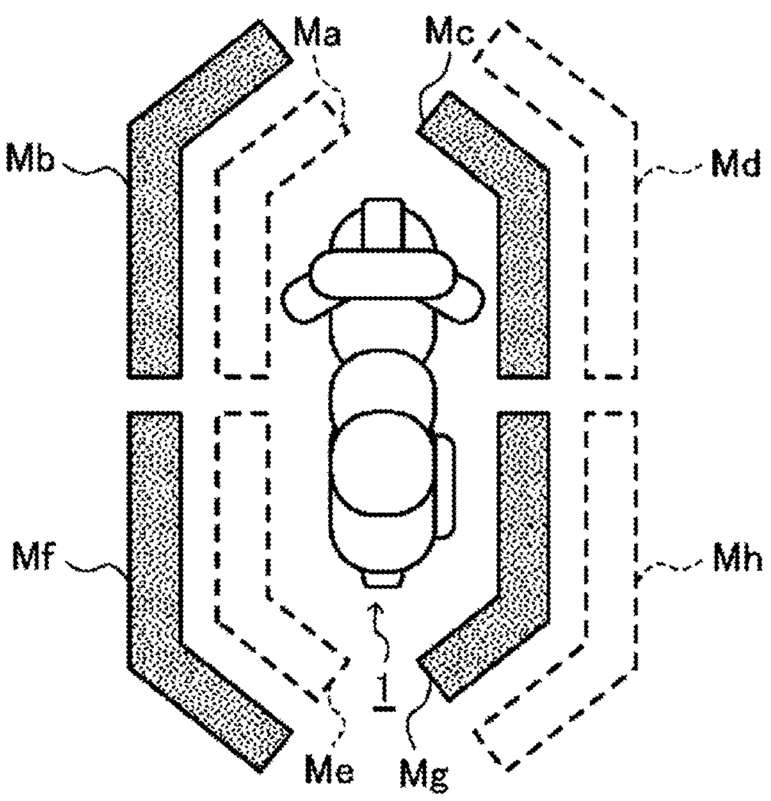
FIG. 5 is a plan view illustrating the projection regions of the area marker when the vehicle turns left.

FIG. 5 is a plan view illustrating the projection regions of the area marker M in a case where the motorcycle 1 turns left. Hereinafter, the operation of the marker lamp 20 in a case where the motorcycle 1 changes from a state of traveling straight to a state of turning left will be described.

In the present example, a state where the vehicle body 10 of the motorcycle 1 is in a vertical state with respect to the road surface and travels straight is referred to as a pre-left turn state, which is an example of the first traveling state. A state where the motorcycle 1 inclines the vehicle body 10 to the left as compared with the pre-left turn state is referred to as a left turning state, which is an example of the second traveling state. For example, in a case where output of the bank angle sensor 25 indicates that the inclined angle of the vehicle body 10 is less than a predetermined value, the lamp controller 21 determines that the vehicle is in the pre-left turn state, and in a case where the output of the bank angle sensor 25 indicates that the leftward inclined angle of the vehicle body 10 is equal to or larger than the predetermined value, the lamp controller 21 determines that the vehicle is in the left turning state. Alternatively, the lamp controller 21 may be configured to estimate the inclined angle based on the image or the video acquired by the external sensor 26 such as a camera, and determine the pre-left turn state and the left turning state.

The region Ma and region Me are examples of a first left side region. The region Mb is an example of a second left side region positioned farther leftward from the motorcycle 1 as compared with the region Ma. The region Mf is an example of the second left side region positioned farther leftward from the motorcycle 1 as compared with the region Me.

First, in a case where the motorcycle 1 is in the pre-left turn state, the lamp controller 21 controls the left front lamp 20FL in a manner of projecting the area marker M onto the region Ma, and controls the left rear lamp 20BL in a manner of projecting the area marker M onto the region Me (FIG. 3). The lamp controller 21 is further configured to control the left rear lamp 20BL in a manner of projecting the area marker M onto the region Me, and controls the right rear lamp 20BR in a manner of projecting the area marker M onto the region Mg (FIG. 3).

Next, it is assumed that the motorcycle 1 changes from the pre-left turn state to the left turning state. At this time, the lamp controller 21 controls the left front lamp 20FL such that the projection region of the area marker M transitions from the region Ma to the region Mb, and controls the left rear lamp 20BL such that the projection region of the area marker M transitions from the region Me to the region Mf (FIG. 5).

Further, while the left turning state continues, the lamp controller 21 controls the left front lamp 20FL such that the area marker M is alternately projected onto the region Ma and the region Mb, and controls the left rear lamp 20BL such that the area marker M is alternately projected onto the region Me and the region Mf (FIG. 3 and FIG. 5 are alternately repeated).

According to the marker lamp 20 of the present example, in a case where the motorcycle 1 turns left, the projection region of the area marker M transitions from the region Ma to the region Mb and transitions from the region Me to the region Mf. Accordingly, the surroundings on a left side of the motorcycle 1 can be notified of the presence of the motorcycle 1, and attention can be directed.

A case in which the motorcycle 1 turns right corresponds to a case in which the motorcycle 1 changes from the state of traveling straight to a state of turning right. The projection region of the area marker M when the motorcycle 1 turns right is horizontally reversed with respect to the projection region of the area marker M when the motorcycle 1 turns left.

For example, in a case where the motorcycle 1 turns right from the normal state, first, in a pre-right turn state (an example of the first traveling state), the lamp controller 21 controls the marker lamp 20 in a manner of projecting the area marker M onto the regions Ma, Mc, Me, and Mg. Next, in a case where the lamp controller 21 determines that the vehicle is in a right turning state (an example of the second traveling state), the lamp controller 21 controls the marker lamp 20 in a manner of projecting the area marker M onto the regions Md and Mh. The region Mc and the region Mg are examples of a first right side region. The region Md is an example of a second right side region positioned farther rightward from the motorcycle 1 as compared with the region Mc. The region Mh is an example of the second right side region positioned farther rightward from the motorcycle 1 as compared with the region Mg.

Further, while the right turning state continues, the lamp controller 21 may control the right front lamp 20FR such that the area marker M is alternately projected onto the region Mc and the region Md, and may control the right rear lamp 20BR such that the area marker M is alternately projected onto the region Mg and the region Mh.

According to the marker lamp 20 of the present example, in a case where the motorcycle 1 turns right, the projection region of the area marker M transitions from the region Mc to the region Md and transitions from the region Mg to the region Mh. Accordingly, the surroundings on a right side of the motorcycle 1 can be notified of the presence of the motorcycle 1, and attention can be directed.

The change in the traveling state is at least one of (starting, stopping) and (straight traveling, left and right turn) and (acceleration and deceleration). As compared with a case where the traveling state does not change, in a case where the traveling state changes, such as starting, stopping, straight traveling, left turn, right turn, or acceleration and deceleration, it is preferable to have the surroundings recognize the presence of the vehicle and direct attention to the vehicle. According to the marker lamp 20 of the present example, the surroundings can be notified of such a change in the traveling state through the projection of the area marker M.

Even if there is a state in which both the region Ma and the region Mb are not projected in a slight time during the transition of the projection region of the area marker M from the region Ma to the region Mb, it is assumed that the area marker M of the present example is projected when it is visually recognized that the region marker M is continuously projected from the one area marker M to the other area marker M. The same applies to the region Mc and the region Md.

The area marker M is projected onto four regions while the motorcycle 1 is in the first traveling state, but the number of projection regions is not limited to four. For example, when the motorcycle 1 is in the pre-acceleration state, the pre-deceleration state, the pre-left turn state, or the pre-right turn state, the area marker M may not be projected onto the regions Me and Mg.

In addition, the first regions (the regions Ma, Mc, Me, and Mg) and the second regions (the regions Mb, Md, Mf, Mh) are arranged in a manner of not overlapping each other, but the arrangement of the first region and the second region is not limited thereto. Although the marker lamp 20 alternately projects the area marker M onto the first region and the second region, the projection method is not limited thereto.

Figure 6:
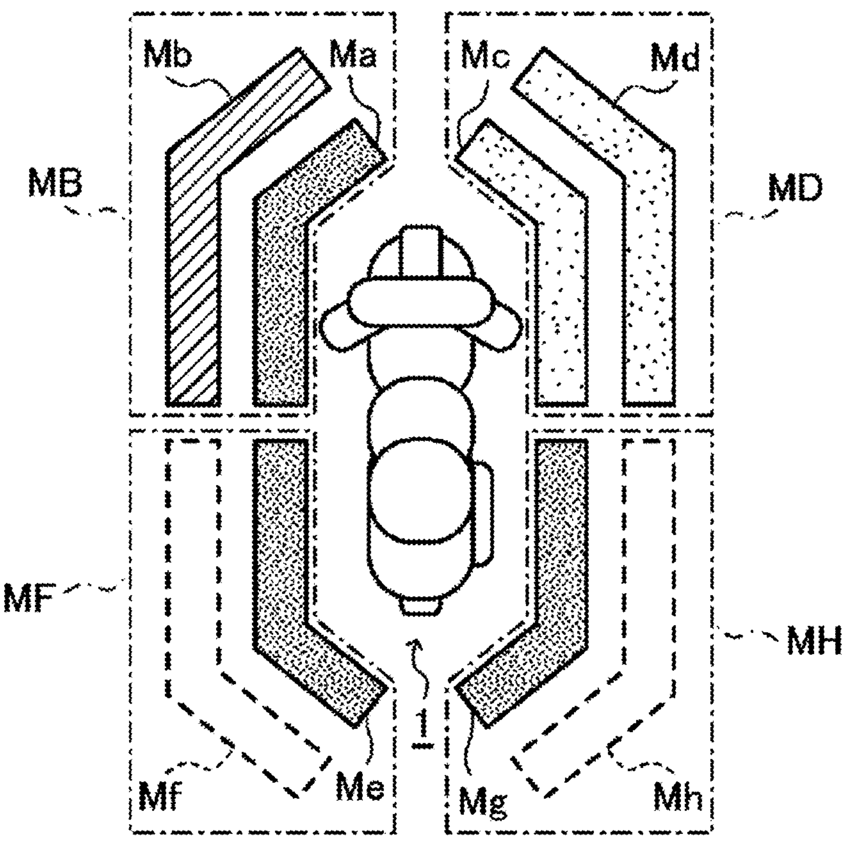
FIG. 6 is a plan view illustrating a modification of the projection regions of the area marker when the vehicle is accelerated.

FIG. 6 is a plan view illustrating a modification of the projection regions of the area marker M in a case where the motorcycle 1 is accelerated. The same or corresponding components as those of the area marker M according to FIGS. 3 and 4 are denoted by the same reference numerals, and the description thereof is omitted.

As indicated by an alternate long and short dash line in FIG. 6, a second region MB includes the region Ma serving as the first region and the region Mb that is a region other than the region Ma. At this time, the left front lamp 20FL may project the area marker M onto the region Ma and also onto the region Mb. That is, in a case where the traveling state of the motorcycle 1 changes, the projection region of the area marker M may transition from the region Ma serving as the first region to both the region Ma and the region Mb serving as the second region MB.

The second region MB includes the region Ma serving as the first region and the region Mb that is a region other than the region Ma, and thus when the area marker M is projected onto the second region MB, the area marker M is projected onto both the region Ma and the region Mb. By projecting the area marker M in a wide range including both the region Ma and the region Mb as described above, the surroundings in a wider range can be notified of the presence of the motorcycle 1 in an emphasized manner.

In a case where the motorcycle 1 is in the accelerating state, that is, in a case where the second traveling state continues, the area marker M may be projected onto both the region Ma and the region Mb. In this way, as compared with a case in which the area marker M is projected onto only one area, the surroundings can be notified of the change in the traveling state in a more emphasized manner.

Similarly, a second region MD may include the region Mc serving as the first region and the region Md that is a region other than the region Mc. At this time, the right front lamp 20FR may project the area marker M onto the region Mc and also onto the region Md. A second region MF may include the region Me serving as the first region and the region Mf that is a region other than the region Me. At this time, the left rear lamp 20BL may project the area marker M onto the region Me and also on to the region Mf A second region MH may include the region Mg serving as the first region and the region Mh that is a region other than the region Mg. At this time, the right rear lamp 20BR may project the area marker M onto the region Mg and also onto the region Mh.

Although the color of the area marker M projected onto the first region and the color of the area marker M projected onto the second region are the same blue color, the color of the area marker M is not limited thereto. The color of the area marker M projected onto the first region and the color of the area marker M projected onto the second region may be different from each other. For example, the color of the area marker M projected onto the region Ma may be blue, and the color of the area marker M projected onto the region Mb may be green (FIG. 6). The color of the area marker M in a case of being projected only onto the region Mc may be blue, and the color of the area marker M in the case of being projected onto the second region MD (the region Mc and the region Md) may be yellow (FIG. 6).

In a case in which the color of the area marker M projected onto the first region and the color of the area marker M projected onto the second region are different from each other as described above, the area marker M is more likely to be visually recognized, which makes it easier for the surroundings to direct attention to the presence of the motorcycle 1, as compared with a case in which the area marker M are projected onto both the first region and the second region with the same color.

The left front lamp 20FL projects the area marker M onto two regions of the region Ma and the region Mb, but the number of projection regions of the area marker M projected from one lamp is not limited to two.

Figure 7:
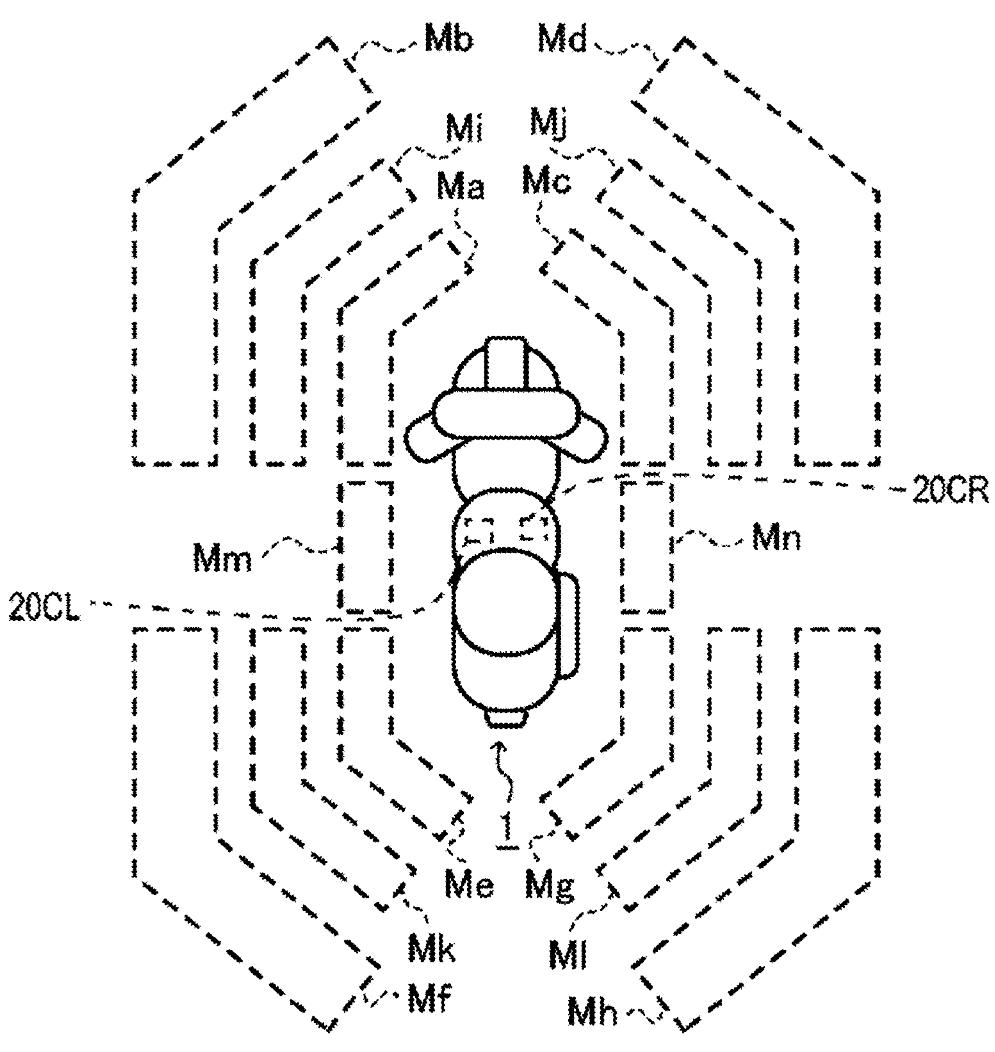
FIG. 7 is a plan view illustrating a modification of the projection regions of the area marker.

FIG. 7 is a plan view illustrating a modification of the projection regions of the area marker M. As illustrated in FIG. 7, the left front lamp 20FL may be configured to project the area marker M onto a region Mi serving as a third region between the region Ma serving as the first region and the region Mb serving as the second region. The left front lamp 20FL may cause the projection region of the area marker M to transition from the region Ma to the region Mi and from the region Mi to the region Mb. An order of the projection regions of the area marker M is not limited thereto. The left front lamp 20FL may be configured to simultaneously project the area marker M onto all of the region Ma, the region Mi, and the region Mb.

Similarly, the right front lamp 20FR may be configured to project the area marker M onto a region Mj serving as the third region between the region Mc serving as the first region and the region Md serving as the second region. The left rear lamp 20BL may be configured to project the area marker M onto a region Mk serving as the third region between a region Me serving as the first region and the region Mf serving as the second region. The right rear lamp 20BR may be configured to project the area marker M onto a region Ml serving as the third region between the region Mg serving as the first region and the region Mh serving as the second region.

In addition to the left front lamp 20FL, the right front lamp 20FR, the left rear lamp 20BL, and the right rear lamp 20BR, the marker lamp 20 of the motorcycle 1 may include a left center lamp 20CL and a right center lamp 20CR. Each lamp of the marker lamp 20 may be attached to a lighting tool such as a front light, a tail light, or a turn signal lamp.

The left center lamp 20CL is disposed at a left center of the vehicle body 10, and is configured to project the area marker M onto a region Mm of the road surface corresponding to the center of the vehicle body 10 in the front and rear direction on the left side of the motorcycle 1. The left center lamp 20CL may be configured to project the area marker M onto the region Mm only in a case where the motorcycle 1 is in the first traveling state, may be configured to perform the projection only in the second traveling state, or may be configured to perform the projection in both the first traveling state and the second traveling state. The region Mm of the present example is arranged between the region Ma and the region Me, but the arrangement position is not limited thereto. The region Mm may be arranged between the region Mb and the region Mf or may be arranged between the region Mi and the region Mk. The region Mm in the present example is separated at a position at which the region Mm does not overlap the region Ma and the region Me, but may partially overlap the region Ma and the region Me. The color of the area marker M projected onto the region Mm may be the same as or different from the color of the area marker M projected onto another region. The region Mm is an example of an intermediate region.

The right center lamp 20CR is disposed at a right center of the vehicle body 10, and is configured to project the area marker M onto a region Mn of the road surface corresponding to the center of the vehicle body 10 in the front and rear direction on the right side of the motorcycle 1. The right center lamp 20CR may be configured to project the area marker M onto the region Mn only when the motorcycle 1 is in the first traveling state, may be configured to perform the projection only in the second traveling state, or may be configured to perform the projection in both the first traveling state and the second traveling state. The region Mn of the present example is arranged between the region Mc and the region Mg, but the arrangement position is not limited thereto. The region Mn may be arranged between the region Md and the region Mh or may be arranged between the region Mj and the region Ml. The region Mn in the present example is separated at a position at which the region Mn does not overlap the region Mc and the region Mg, but may partially overlap the region Mc and the region Mg. The color of the area marker M projected onto the region Mn may be the same as or different from the color of the area marker M projected onto another region. The region Mn is an example of the intermediate region.

According to the marker lamp 20 of the present example, since the area marker M is also projected onto the region Mm and the region Mn serving as the intermediate region, a more complex area marker M can be projected around the motorcycle 1. This makes it easier for the surroundings to direct attention to the presence of the motorcycle 1.

Figure 8:
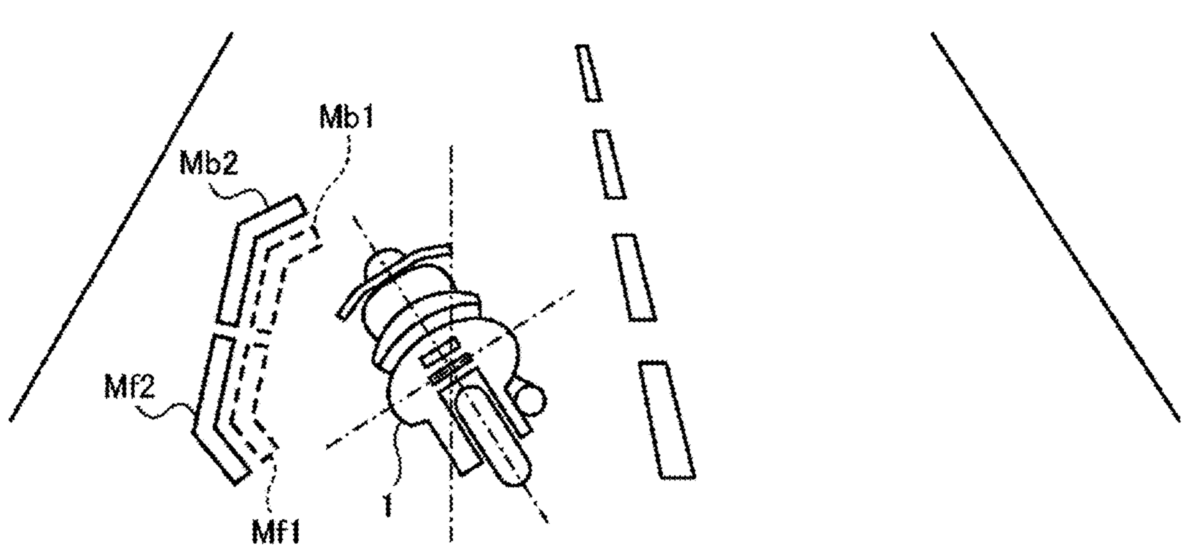
FIG. 8 is a schematic diagram illustrating a modification of the projection regions of the area marker when the vehicle turns left.

In a case where the motorcycle 1 turns left, the area marker M may be projected farther leftward as compared with the projection region onto which the area marker M is projected when the motorcycle 1 travels straight. FIG. 8 is a schematic diagram illustrating a modification of the projection regions of the area marker M when the motorcycle 1 turns left. In order to avoid complexity of the drawing, FIG. 8 illustrates only the motorcycle 1, the region Mb (a region Mb1 and a region Mb2), and the region Mf (a region Mf1 and a region Mf2).

As illustrated in FIG. 8, in a case where the motorcycle 1 turns left, the driver moves a center of gravity to the left, so that the motorcycle 1 travels while inclining the vehicle body 10 to the left and increasing a bank angle. At this time, since the vehicle body 10 is inclined to the left, a distance between the left front lamp 20FL and the road surface is shortened, and the area marker M is projected onto the region Mb1 that is close to the vehicle body 10. The region Mb1 is the projection region onto which the area marker M is projected in a case where the motorcycle 1 travels straight. Similarly, in a case where the motorcycle 1 turns left, the area marker M is projected onto the region Mf1. However, if the area marker M is projected onto a position close to the vehicle body 10, it is insufficient to notify the surroundings in a wide range on the left side of the motorcycle 1 of the presence of the motorcycle 1.

Therefore, the marker lamp 20 of the present example is configured to adjust the projection region of the area marker M according to the bank angle. That is, the left front lamp 20FL may be configured to project, according to the bank angle of the vehicle body 10, the area marker M onto the region Mb2 that is positioned farther leftward as compared with the region Mb1 onto which the area marker M is projected when the motorcycle 1 travels straight (FIG. 8). For example, an optical component in the left front lamp 20FL may be rotatably installed, and an angle of the optical component with respect to the vehicle body 10 may be adjusted according to the bank angle of the vehicle body 10. Similarly, the left rear lamp 20BL may project, according to the bank angle of the vehicle body 10, the area marker M onto the region Mf2 that is positioned farther leftward as compared with the region Mf1 onto which the area marker M is projected when the motorcycle 1 travels straight (FIG. 8). The same applies to the region Ma and the region Me.

As described above, according to the marker lamp 20 of the present example, in a case where the motorcycle 1 turns left, the area marker M is projected farther leftward as compared with the projection region (the region Mb1 and the region Mf1 in FIG. 8) onto which the area marker M is projected in a case where the motorcycle 1 travels straight, and thus the surroundings in a wider range on the left side of the vehicle body 10 can be notified of the presence of the motorcycle 1.

Similarly, in a case where the motorcycle 1 turns right, the marker lamp 20 of the present example projects the area marker M farther rightward as compared with the projection region onto which the area marker M is projected when the motorcycle 1 travels straight. Therefore, the surroundings in a wider range on the right side of the vehicle body 10 can be notified of the presence of the motorcycle 1.

In the marker lamp 20 according to the present disclosure, in response to a determination that calling attention of another traffic participant is required, the projection region of the area marker M transitions from the first region to the second region different from the first region. The case in which calling attention of the another traffic participant is required is a situation in which the external sensor 26 or the like detects a pedestrian or a surrounding vehicle in a state where the motorcycle 1 is traveling at a predetermined speed in addition to acceleration, deceleration, and right or left turn.

The marker lamp 20 includes the turn switch 24 configured to acquire the traveling state of the motorcycle 1; the external sensor 26 configured to acquire information on the another traffic participant; and the lamp controller 21 configured to determine that the attention of the traffic participant is required to be called in a case where the traveling state of the motorcycle 1 and the information on the traffic participant satisfy a predetermined condition, and cause the projection region of the area marker M to transition from the first region to the second region when determining that the calling of attention is required. The acceleration sensor 22, the brake sensor 23, and the bank angle sensor 25 may be configured to acquire the traveling state of the motorcycle 1. These sensors may be used in combination.

Figure 9:
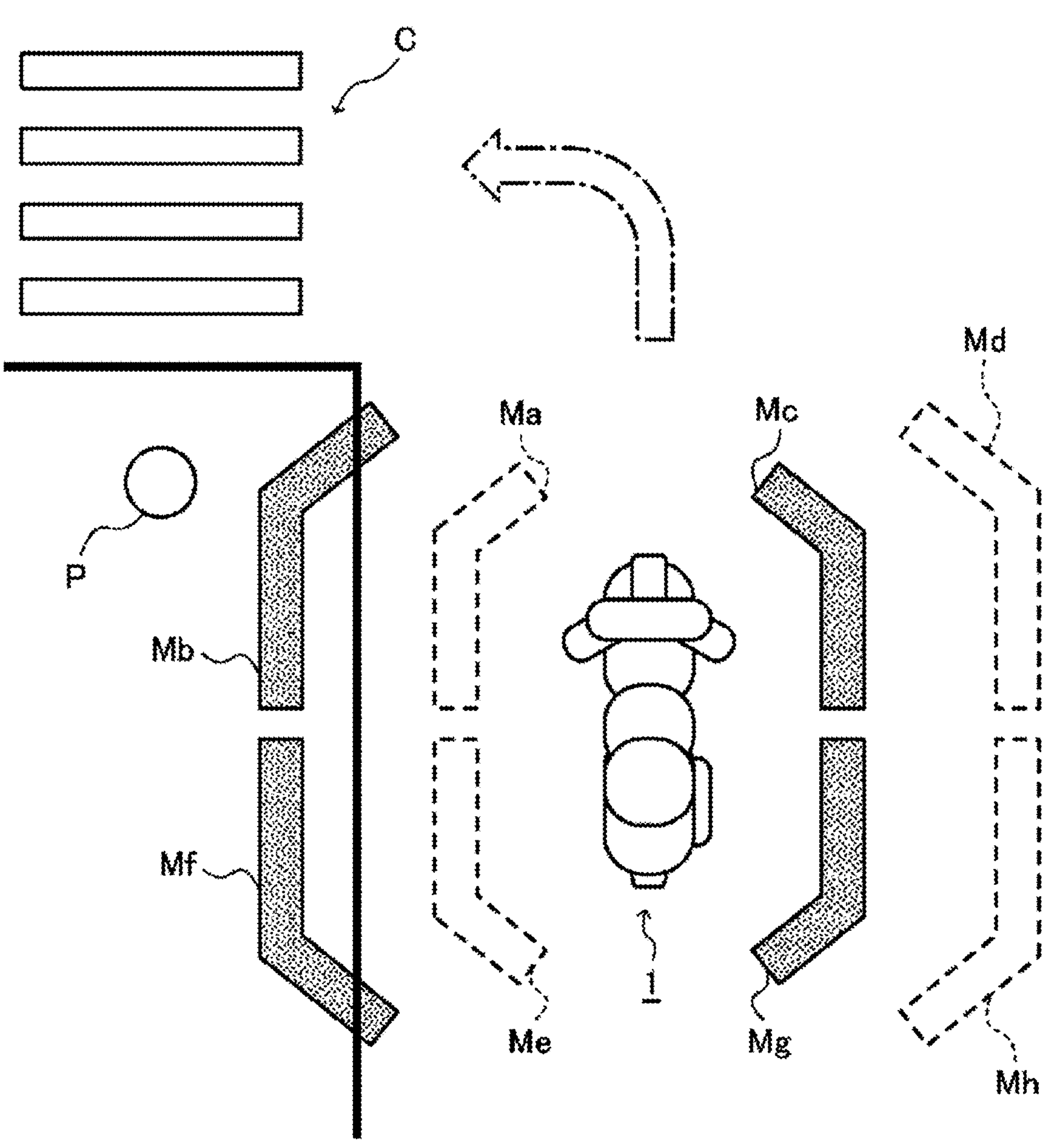
FIG. 9 is a plan view illustrating the projection regions of the area marker when the vehicle turns left in a situation in which a pedestrian is going to cross a crosswalk.

FIG. 9 is a plan view illustrating the projection regions of the area marker M in a case in which the motorcycle 1 is going to turn left in a situation in which a pedestrian is going to cross a crosswalk. As illustrated in FIG. 9, when a pedestrian P is going to cross a crosswalk C, the motorcycle 1 is going to turn left and enter the crosswalk C. In a case where the motorcycle 1 is an electric vehicle, sound emitted from the motorcycle 1 during traveling is quieter as compared with that of a gasoline vehicle. Since the sound from the motorcycle 1 is small, the pedestrian P may not notice the motorcycle 1 that is going to turn left or may notice the motorcycle 1 later. The pedestrian P is an example of the traffic participant.

Here, the turn switch 24 is configured to acquire "left turn" information as the traveling state of the motorcycle 1. Further, the external sensor 26 is configured to detect that the pedestrian P is present on the left side of the vehicle body 10 as the information on the another traffic participant. In a case where the left turn information and the information on the pedestrian P satisfy the predetermined condition, the lamp controller 21 determines that the calling of attention of the pedestrian P is required. The predetermined condition may be that, for example, the pedestrian P is present in the traveling direction of the motorcycle 1 and within a predetermined range from the vehicle body 10.

In a case where the lamp controller 21 determines that the calling of attention of the pedestrian P is required, the lamp controller 21 controls the left front lamp 20FL such that the projection region of the area marker M transitions from the region Ma to the region Mb, and controls the left rear lamp 20BL such that the projection region of the area marker M transitions from the region Me to the region Mf (FIG. 9).

In this way, in a case where the lamp controller 21 determines that the calling of attention of the pedestrian P is required, the projection region of the area marker M transitions from the region Ma to the region Mb and transitions from the region Me to the region Mf. Since the area marker M is projected in a manner of transitioning to a plurality of regions, the pedestrian P can be more effectively notified of the presence of the motorcycle 1. The area marker M may be projected only onto the regions Ma and Mb without being projected onto the regions Me and Mf.

Although the embodiment of the present disclosure has been described above, it is needless to say that the technical scope of the present disclosure should not be construed as being limited by the description of the embodiment. The present embodiment is merely an example, and it is understood by those skilled in the art that various modifications of the embodiment are possible within the scope of the invention described in the claims. The technical scope of the present disclosure should be determined based on the scope of the invention described in the claims and the equivalent scope thereof.

The present application claims the priority based on Japanese patent application No. 2022-036214 filed on Mar. 9, 2022, and all the contents described in the Japanese patent application are incorporated.

The invention claimed is:

1. A road surface rendering device mounted on a vehicle for projecting an area marker on a road surface around the vehicle,
- wherein the road surface rendering device is configured to:
- constantly project the area marker at least during nighttime traveling of the vehicle; and
- in a case where a traveling state of the vehicle changes such that the vehicle is accelerated, transition a projection region of the area marker from a first region to a second region different from the first region.

2. The road surface rendering device according to claim 1, wherein the road surface rendering device is configured to position the second region farther from the vehicle as compared with the first region.

3. The road surface rendering device according to claim 1, wherein the first region and the second region do not overlap each other.

4. The road surface rendering device according to claim 1, wherein the second region includes the first region and a region other than the first region.

5. The road surface rendering device according to claim 1, wherein the road surface rendering device is configured to project a color of the area marker onto the first region and project a color of the area marker onto the second region that is different from the color projected onto the first region.

6. The road surface rendering device according to claim 1, wherein the second region is different in a front and a rear direction from the first region.

7. The road surface rendering device according to claim 6, wherein the road surface rendering device is configured to:
- position the first region that includes a first front region in front of the vehicle; and
- position the second region that includes a second front region farther forward from the vehicle as compared with the first front region; and
- transition the projection region of the area marker from the first front region to the second front region.

8. The road surface rendering device according to claim 7, wherein the road surface rendering device is configured to:
- position the first region that includes a first rear region in rear of the vehicle;
- position the second region that includes a second rear region farther rearward from the vehicle as compared with the first rear region;
- in a case where the vehicle is decelerated, transition the projection region of the area marker from the first rear region to the second rear region; and
- project the area marker onto an intermediate positioned region between the first front region and the first rear region.

9. The road surface rendering device according to claim 1, wherein the road surface rendering device is configured to:
- position the first region that includes a first rear region in rear of the vehicle;
- position the second region that includes a second rear region farther rearward from the vehicle as compared with the first rear region; and
- in a case where the vehicle is decelerated, transition the projection region of the area marker from the first rear region to the second rear region.

10. The road surface rendering device according to claim 1, wherein the road surface rendering device is configured to:
- position the first region that includes a first left side positioned region on a left side of the vehicle;
- position the second region that includes a second left side region farther leftward from the vehicle as compared with the first left side region; and
- in a case where the vehicle turns left, transition the projection region of the area marker from the first left side region to the second left side region.

11. The road surface rendering device according to claim 1, wherein the road surface rendering device is configured to:
- position the first region that includes a first right side region on a right side of the vehicle;
- position the second region that includes a second right side region farther rightward from the vehicle as compared with the first right side region; and
- in a case where the vehicle turns right, transition the projection region of the area marker from the first right side region to the second right side region.

12. The road surface rendering device according to claim 1,
- wherein the vehicle is a vehicle configured to turn by inclining a vehicle body in a bending direction.

13. The road surface rendering device according to claim 10,
- wherein the vehicle is a vehicle configured to turn by inclining a vehicle body in a bending direction,
- in a case where the vehicle turns left, the road surface rendering device is configured to position the projection region of the area marker farther leftward as compared with the first left side region and the second left side region that are projected when the vehicle travels straight; and
- in a case where the vehicle turns right, the road surface rendering device is configured to position the projection region of the area marker farther rightward as compared with the first right side region and the second right side region that are projected when the vehicle travels straight.

14. A road surface rendering device according to claim 1 wherein in response to a determination that calling attention of a traffic participant is required, the road surface rendering device is configured to transition a projection region of the area marker from a first region to a second region different from the first region.

15. The road surface rendering device according to claim 14 comprising:

a controller configured to:

acquire a traveling state of the vehicle;

acquire information on the traffic participant;

determine that the attention of the traffic participant is required to be called, in a case where the traveling state of the vehicle and the information on the traffic participant satisfy a predetermined condition; and cause the projection region of the area marker to transition from the first region to the second region, in a case where the controller determines that the calling of attention is required.

* * * * *